United States Patent [19]

Black

[11] Patent Number: 4,751,696
[45] Date of Patent: Jun. 14, 1988

[54] CENTREX ATTENDANT CONSOLE INTERFACE

[75] Inventor: James B. Black, Phoenix, Ariz.

[73] Assignee: GTE Communication Systems Corporation, Phoenix, Ariz.

[21] Appl. No.: 127,522

[22] Filed: Nov. 30, 1987

Related U.S. Application Data

[63] Continuation of Ser. No. 813,322, Dec. 24, 1985, abandoned.

[51] Int. Cl.⁴ .......................................... H04L 11/08
[52] U.S. Cl. .................................................. 370/58
[58] Field of Search ................... 370/58, 62, 63, 110.1; 379/93, 94

[56] References Cited

U.S. PATENT DOCUMENTS

| 3,426,158 | 2/1969 | Browne et al. | 370/58 |
| 4,456,991 | 6/1984 | Chea, Jr. et al. | 370/58 |
| 4,521,879 | 6/1985 | Gueldenpfennig et al. | 370/62 |

Primary Examiner—Douglas W. Olms
Assistant Examiner—Melvin Marcelo
Attorney, Agent, or Firm—Anthony Miologos

[57] ABSTRACT

An interface circuit for transmitting data and voice signals between a CENTREX equipped central office exchange and a remotely located attendant console. The interface circuit includes an analog interface arranged to receive analog voice signals from the attendant console and to convert the analog signals into digital signals for transmission to the central office exchange. Alternatively, digital signals received from the central office exchange are converted to analog voice signals and are transmitted to the attendant console. A digital interface connecting the attendant console and the central office exchange includes an interface controller arranged to control the operation of the digital interface. The digital interface further includes input data storage means for storing digital data transmitted by the central office exchange, output data storage means for storing digital data transmitted by the attendant console and serial transmission/receiving means for transmitting and receiving the digital data transmitted and received between the interface circuit and the attendant console. Responsive to control signals from the central office exchange, control data written to the input data storage means is processed by the interface controller and transmitted to the attendant console via the serial transmission/receiving means. Similarly, responsive to control signals from the interface controller, data processed and written to the output data storage means is read by the central office exchange.

6 Claims, 2 Drawing Sheets

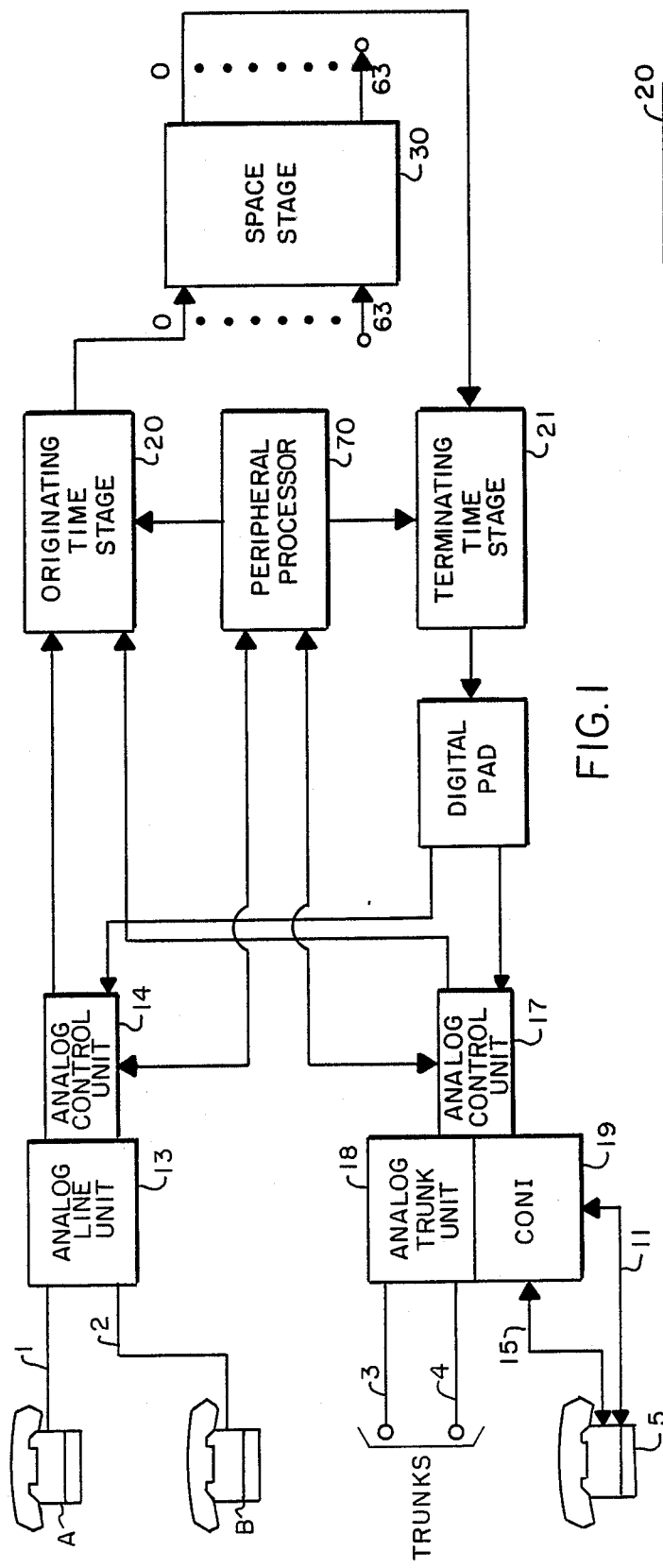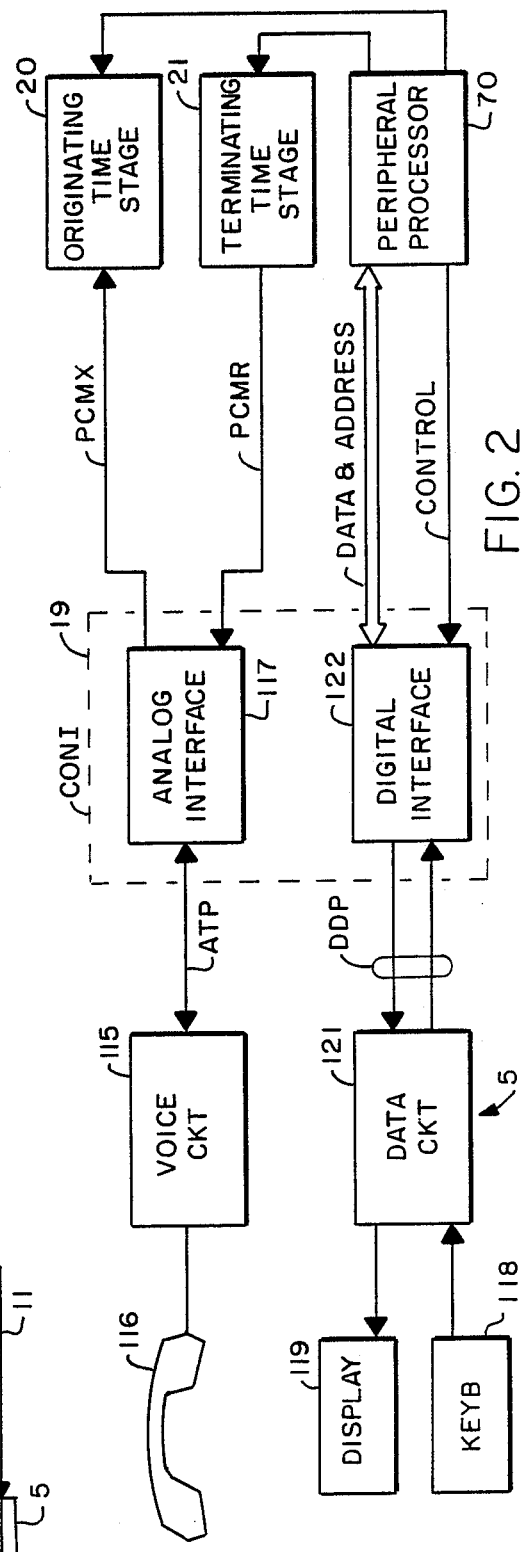

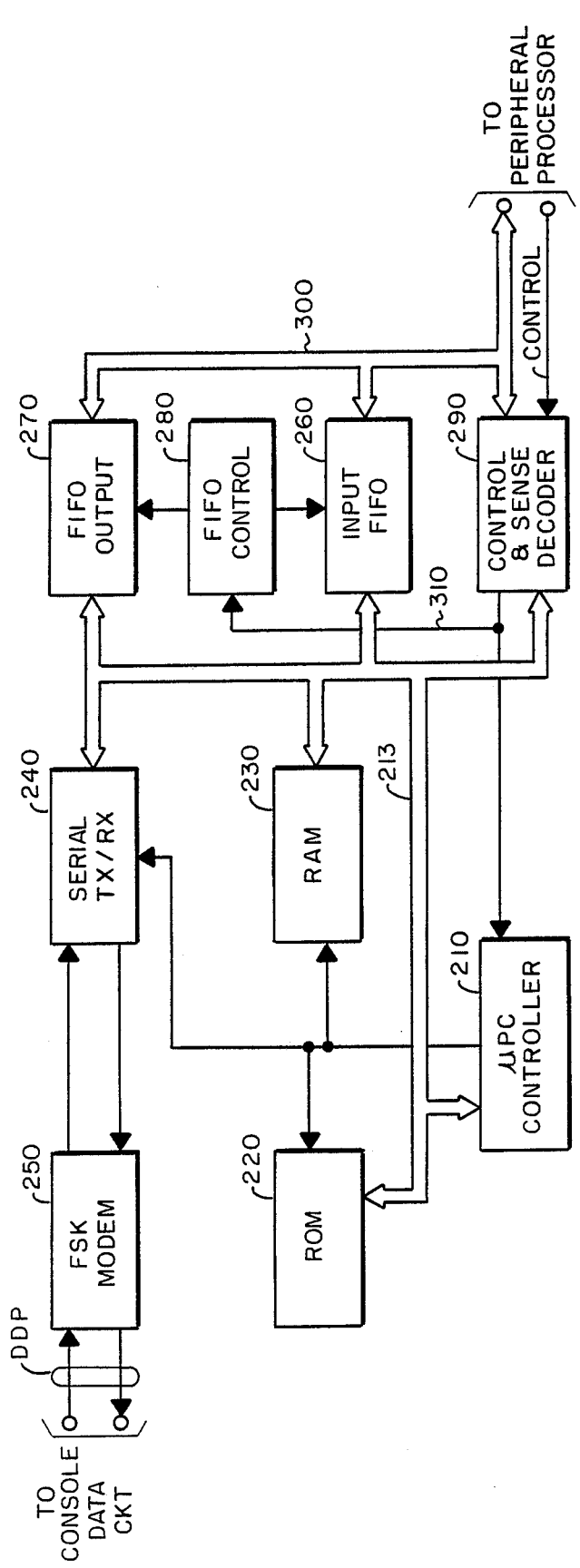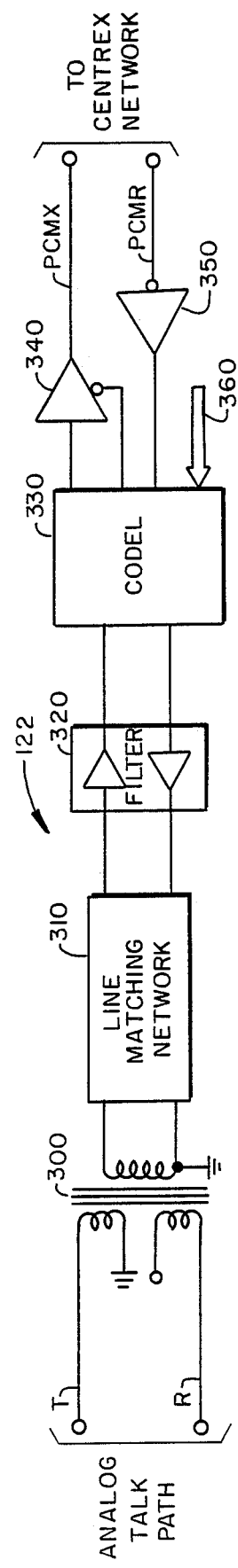
FIG. 3
FIG. 4

CENTREX ATTENDANT CONSOLE INTERFACE

This is a continuation of application Ser. No. 813,322 filed on Dec. 24, 1985, now abandoned.

CROSS-REFERENCE TO RELATED APPLICATIONS

The present application is related to the following co-pending U.S. Patent Applications all having the same inventive entity and being assigned to the same assignee:

Ser. No. 813,188, titled, "AN INTERFACE CIRCUIT FOR TRANSMITTING KEYCODES TO A CENTREX;" U.S. Pat. No. 4,706,278;

Ser. No. 813,187, titled, "AN INTERFACE CIRCUIT FOR TRANSMITTING COMMAND CODES TO AN ATTENDANT CONSOLE;" U.S. Pat. No. 4,706,277;

Ser. No. 813,321, titled, "CONTROL CIRCUIT FOR A CENTREX ATTENDANT CONSOLE INTERFACE;" U.S. Pat. No. 4,685,103;

Ser. No. 813,186, titled, "AN ARRANGEMENT FOR TRANSFERRING DATA TO A CENTREX;" U.S. Pat. No. 4,706,276;

Ser. No. 813,185, titled, "AN ARRANGEMENT FOR TRANSFERRING DATA TO AN ATTENDANT CONSOLE;" U.S. Pat. No. 4,723,274;

Ser. No. 813,176, titled, "AN ARRANGEMENT FOR INITIALIZING A CENTREX CONSOLE INTERFACE CIRCUIT;" U.S. Pat. No. 4,706,279.

BACKGROUND OF THE INVENTION

The present invention relates in general to telecommunication switching systems and more particularly to an interface linking voice and data communications between a CENTREX equipped central office exchange and an attendant console.

Private Branch Exchanges (PBX) are telecommunication systems which provide communication services to customers having plurality of subscriber instruments. The PBX equipment provides a host of enhanced features such as call forwarding, intercom functions, least cost routing of calls and detailed billing. Normally the PBX is purchased by the customer and installed on premises at his location. Therefore, since the PBX handles a first level of switching among the subscriber instruments fewer central office lines are required and therefore access charges are lower. However, this savings is offset by the initial cost of the PBX equipment.

An alternative to the classical PBX is being offered in the Telecommunication market today which provides all of the features of a PBX without any of the initial costs. This system known in the field as CENTREX (central exchange) allows either a portion of a central office network switching system or a dedicated CENTREX central office network switching system to function and provide the services and features as would a dedicated PBX. The customers subscriber instruments are connected directly to the CO switch or concentrated with a multiplexing device and connected via trunk lines. The telephone operating company providing the service would service the switch therefore, alleviating the customer of maintaining his own equipment. Of course access charges are somewhat higher with the CENTREX than those with the on premises PBX equipment.

Usually PBX equipment includes an attendant console which monitors the PBX, i.e. lines or trunks in use, and provide a means of selecting or deselecting features and services as well as a system status display. Additionally, the console can also serve as a central operator station providing for attendant call handling. Such consoles are also used with CENTREX systems to provide the features discussed above.

It therefore becomes the object of the present invention to provide a console interface circuit to link an attendant console normally located at the customer premises with a CENTREX network system located at a telephone operating companies central office.

SUMMARY OF THE INVENTION

In accomplishing the object of the present invention there is provided an interface circuit for transmitting data and voice signals between a CENTREX equipped central office exchange and a remotely located attendant console.

The interface circuit of the present invention comprises, an analog interface having one end connected to the attendant console via an analog talk path and a second end connected to the central office exchange via a digital path. The analog interface is arranged to receive analog voice signals from the attendant console and convert the analog signals into pulse code modulated (PCM) digital signals for transmission of the PCM digital signals, via the digital path, to the central office exchange.

Alternatively, the analog interface receives PCM digital signals, via the digital path, from the central office exchange and converts the PCM digital signals to analog voice signals passing the analog voice signals over the analog talk path to the attendant console.

The interface circuit of the present invention further includes a digital interface connected to the attendant console via a digital data path and to the central office exchange via an address/data bus. The digital interface further includes an interface controller arranged to control the operation of the digital interface, input data storage means for storing digital data transmitted by the central office exchange, output data storage means for storing digital data transmitted by the console and serial transmission/receiving means for transmitting the digital data between the interface circuit and the attendant console.

Responsive to control signals from the central office exchange, data from the central office exchange is written to the input data storage means. The interface controller then processes the data and transfers the data for transmission to the attendant console via the serial transmission/receiving means.

Alternatively, responsive to control signals from the serial transmission/receiving means the interface controller stores data in the output data storage means received by the serial transmission/receiving means. The interface controller then signals the central office exchange which reads the data from the output data storage means.

A BRIEF DESCRIPTION OF THE DRAWINGS

A better understanding of the invention may be had from the consideration of the following detailed description taken in conjunction with the accompanying drawings in which:

FIG. 1 is block diagram of a CENTREX network system embodying the present invention.

FIG. 2 is block diagram showing the linking paths of the present invention interface the attendant console and the CENTREX network system.

FIG. 3 is a block diagram of the digital line interface of the present invention.

FIG. 4 is a block diagram of the analog line interface.

DESCRIPTION OF THE PREFERRED EMBODIMENT

Referring to FIG. 1, a time-space-time digital switching system having a central exchange or CENTREX feature is shown. As a standard central office exchange telephone instruments A and B are connected to the network switching system via analog subscriber lines 1 and 2 to an analog line unit 13. The analog data received is converted to Pulse Code Modulated (PCM) digital signals for output to the next network stage. Analog line unit 13 is connected to analog control unit 14. Originating time switch 20 is connected to a space switch unit 30, which in turn is connected to a terminating time switch 21. Terminating time switch 21 is connected to analog control unit 14 and finally back to analog line unit 13 where the PCM digital signals are converted to analog signals and transmitted down lines 1 and 2.

Terminating time switch 21 is further connected an analog control unit 17, analog trunk unit 18 and trunks 3 and 4. Analog trunk unit 18 can be dedicated exclusively for CENTREX use. The trunk unit 18 connects the CENTREX customers subscriber instruments to the network system.

The Console Interface Circuit (CONI) 19 of the present invention is connected to a duplex pair of an analog control unit 17 and provides the means by which system commands, display messages and attendant console keycodes are transferred between the attendant console 5 and the CENTREX network system. The operation of the CONI circuit is transparent to both the system and the attendant console. Communication between CONI 19 and console 5 is via a digital data path 15 and an analog talk path 11.

Turning now to FIG. 2, a block diagram illustrating the interface of the attendant console to the CENTREX system is shown. The CONI interfaces the attendant console 5 and CENTREX system via two distinct communication links. In the first link, all analog signals are interfaced from the console handset 116, via voice transmission circuit 116 and analog talk path (ATP) to the analog interface 117 in the CONI 19. The analog signals are converted in the analog interface 117 into pulse code modulated (PCM) signals and transmitted to the originating time stage 20 of the CENTREX network via PCM path PCMX.

Likewise, analog information destined for the attendant console 5, is applied in PCM form to PCM path PCMR from the terminating time stage 21. The PCM information is converted into analog information by the analog interface 117 of CONI 19 and sent to handset 116 through the ATP and voice circuit 115. This communication link forms the talking path between the console 5, the CONI 19 and the network system of the CENTREX.

The data link between the console 5 and the CONI 19 is routed from a keyboard via a console data circuit 121 and a 4 wire full duplex data link (DDL) to the digital interface 122. Data input by the console operator is converted by the data circuit 121 into asynchronous data messages comprising 1 start bit, 7 data bits, an even parity bit and a stop bit. The data messages are transmitted over the DDL via a 1200 baud Frequency Shift Key (FSK) modem located in data circuit 121. The data transmitted by the console is received by the CONI 19 digital interface 122, converted into 8-bit data bytes and is processed by the CONI. The data is passed on to the network via ACU 17 to the peripheral processor 70 if no action is required by the CONI. The CONI thereby assumes a "transparent" front to the CENTREX network system and functions as a transaction exchange medium. Alternatively, in certain cases keycodes and command codes received by the CONI are acted upon and responded to by the CONI.

Data from the peripheral processor 70 in the form of command codes is transmitted to the CONI digital interface 122. Again if the data is destined only for the console the CONI formats the data into FSK asynchronous data messages and transmits the messages over the 1200 baud DDL to the console data circuit 5. The data is interpreted by the console and the appropriate display device 119 activated, i.e. LEDs turn on or off, a message displayed, the display cleared, or an audible alarm turned on or off.

Turning now to FIG. 3, a detailed explanation of the CONI digital interface will be given.

The CONI interface of the present invention is comprised of the following Large Scale Integrated (LSI) devices. A controller portion includes a microprocessor 210 connected to a Read Only Memory (ROM) 220 and Random Access Memory (RAM) 230 through an address/data bus 213. The ROM circuit 220 stores the operating system used by the microprocessor 210 which controls the operation of the CONI interface. The RAM is used as a temporary storage area for the message bytes received by the CONI. This controller portion of the CONI interface is connected to the console 5 via a serial Transmitter/Receiver (Tx/Rx) 240 and a Frequency Shift Key (FSK) modem chip 250.

The serial Tx/Rx is a LSI Universal Serial Asynchronous Receiver Transmitter (USART) such as the Intel 8259. This device under control of the microprocessor translates the 8 data bits sent to the USART on the parallel data bus into the asynchronous serial data words described earlier. The FSK modem translates the data into audio tones for the transmission of the data down a twisted pair transmission path (DDP).

The connection between the CONI interface and the peripheral processor is accomplished via a pair of 64×4 First In First Out (FIFO) circuits. An input FIFO 260 and an output FIFO 270 each have one side of the FIFOs connected to address/data bus 300 which extends from the peripheral processor. Each FIFO is further connected to the CONI address/data bus 213. A control and sense decoder 290 is also connected to the peripheral processor address/data bus 300 and CONI address/data bus 213. The control and sense decoder interprets control words sent by the peripheral processor detailing the type of messages sent to the CONI and any special handling that is required. The control and sense decoder 290 also communicates to the microprocessor and a FIFO control circuit via control lead 310.

The CONI interface circuit communicates to the console 5 and to the CENTREX network system by accepting information from one and transferring that information to the other. In order for this to be accomplished in the most expedient manner, the CONI will use a priority structure to decide which action to take. The priority is as follows:

| | | |
|---|---|---|
| PRIORITY 1 | - highest - | console incoming data to CONI |
| PRIORITY 2 | | console outgoing data from CONI |
| PRIORITY 3 | | CONI data from the network |
| PRIORITY 4 | - lowest - | CONI data to the network |

With renewed reference to FIG. 3 an explanation of data transfer and exchange of signals between the CENTREX network system and the console will now be given, with the data moving towards the console 5. Normally the system requires the CONI to report an error word. If no error is reported, than the data transfer begins.

The peripheral processor sets and sends to the control and sense decoder 290 a control signal which is subsequently passed to the FIFO control 280. This control word enables the input FIFO 260 so that it can accept data messages in the form of command codes from the peripheral processor over bus 300. The data is transmitted over bus 300 in nibble form (4 bit field) with the high order nibble first and entered into the input FIFO 260. The data is sent in the same format as the console 5 is expecting to receive, including checksum characters.

After all the information is transferred the peripheral processor will signal the CONI that all the data has been transferred which is passed to the microprocessor via control and sense decoder 290. The CONI will then begin transferring the data out of the input FIFO 260. The received data is formatted back into 8 bit bytes and stored into RAM 230 for the subsequent transfer to the console 5. At this time the checksum of the received byte is checked. If the checksum does not compare the microprocessor clears the input FIFO 260 and sends a control word to the system to resend the last data byte and resets the FIFO input to receive the retransmitted data message.

As the messages are stored in RAM 230 the microprocessor interprets the messages and ascertains if they are destined for the console or for the CONI. Data messages destined for the console are transferred from RAM 230 over address/data bus 213 to the serial Tx/Rx 240. The parallel data messages input to serial Tx/Rx 240 are converted into asynchronous serial data and output to FSK modem 250 where they are subsequently transmitted over a twisted pair to the console 5. The console sends a message back to the CONI either acknowledging or not acknowledging the data transmitted.

The transfer of data messages from the console to the CENTREX network system, with the data moving towards the system will now be given. Keycode messages sent to the CONI are received as FSK modulated asynchronous serial data by the FSK modem 250. The received data message is then converted into a parallel 8 bit data bytes by the serial Tx/Rx 240 and output to the RAM 230 for temporary storage. The CONI will verify via the recomputed checksum if the message is valid. After 5 invalid messages the CONI will report to the system an error code via an error field output. On a valid data message the CONI will clear the output FIFO 270 and transfer the valid message to the FIFO. The CONI then signals the peripheral processor via a control signal sent via the control and sense decoder 290 that a valid message is in FIFO 270. The peripheral processor sets a reply control signal to the FIFO control 280 and reads the data from the output FIFO 260. The data is read out to buss 300 in nibble form (4 bits) with the high order nibble first.

When all data has been output the peripheral processor 70 signals the CONI that it has received the message thereby allowing the CONI to reset.

As explained earlier and shown on FIG. 2 the CONI also includes an audio interface for transmitting analog voice signals between the console 5 and CENTREX network system and CENTREX network system to the console 5. The analog interface between the console 5 and the CONI consists of a single tip and ring voice pair (T and R). On this analog pair voice conversations and DTMF tones are transmitted. The system provides the talk battery on the tip and ring leads which also powers the DTMF generator in the console. The console 5 contains a standard network interface.

Turning now to FIG. 4, the analog interface of the CONI is illustrated. The interface 122 includes a two to four wire hybrid coil 300, a line matching network 310 in the form of an electrical hybrid, a transmit and receive amplifier and filter comprised of an INTEL 2912 filter and an INTEL 2910 CODEC (COder/DECoder). The hybrid coil 300 interfaces directly to the line matching network 310. The line matching network includes the necessary components for two balancing networks. This allows the use of −5 volt non-loaded lines or +12 volt loaded lines. The line matching network 310 is connected via lines TX and RX to filter network 320. The TX line connects to a transmit filter in the filter 320 as does the RX line to a receive filter. The filters also have provisions for adding the necessary gain in both the transmit and receive paths. The filter 320 is further connected via lines TX and RX to the CODEC 2910. The output of the transmit filter drives the analog input of CODEC 330. The CODECs primary function is to encode an analog signal into a 8 bit PCM word which is then sent to the network in the proper channel via driver 340 and the PCM transmit bus PCMX.

Similarly, the CODEC 330 will clock in information from the receive PCM bus PCMR and driver 350 during its assigned channel. The binary signal is then decoded into PAM (pulse amplitude modulated) signals by the CODEC and converted into an analog signal by the receive filter of filter 320. The analog signal is then applied to the console via the line matching network and the T and R leads of the hybrid coil 300. Controls signals 360 connected to the peripheral processor allows the CODEC to be programmed to operate in a specific manner i.e. transmit and receive, transmit only or operate within a certain time slot.

It should be noted since the CONI analog interface and digital interface use two distinct communication links to transmit information between the console 5 and the CENTREX network system. The analog talk path and the duplex data path may be used simultaneously in transmission and reception of analog and digital data Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. An interface circuit for transmitting data and voice signals between a CENTREX equipped central office exchange and a remotely located attendant console comprising:

an analog interface having one end connected to said attendant console via an analog talk path and a second end connected to said central office exchange via a digital path, said analog interface arranged to receive analog voice signals from said attendant console and convert said analog voice signals into pulse code modulated (PCM) digital signals for transmission of said PCM digital signals, via said digital path, to said central office exchange and alternatively, to receive said PCM digital signals, via said digital path, from said central office exchange and convert said PCM digital signals to said analog voice signals passing said analog voice signals over said analog talk path to said attendant console;

a digital interface having one end connected to said attendant console via a digital data path and a second end connected to said central office exchange via an address/data bus and control bus, said digital interface further including an interface controller arranged to control the operation of said digital interface, said interface controller comprising a microprocessor arranged to control the operation of said digital interface circuit, a Read Only Memory (ROM) for storing the operating program used by said microprocessor, and Random Access Memory (RAM) for storing temporarily keycode or command code data when said digital interface is processing said data, at least one input First In First Out (FIFO) memory device having its inputs connected to said central office exchange via said address/data bus, said input FIFO arranged to receive and store sequentially digital data transmitted by said central office exchange, and serial transmission/receiving means connected to said interface controlled and said input FIFO and said digital data path; and responsive to control signals from said central office exchange, said central office exchange writes command code data in nibble form to said input FIFO in the exact sequence in which said attendant console expects said data and said central office exchange signals said interface controller that data is available in said input FIFO, whereby said interface controller reads said data from said FIFO in nibble form and processes said command code data into data bytes, placing said data on said digital data path for transmission to said attendant console via said serial transmission/receiving means.

2. The interface circuit as claimed in claim 1, wherein: said serial transmission/receiving means comprises a serial Transmitter/Receiver (Tx/Rx) and a frequency Shift Key (FSK) modem, and said serial Tx/Rx is connected to said interface controller and to said input FIFO and said serial Tx/Rx receiver receives command code data bytes processed by said interface controller wherein, said data bytes are converted from parallel data to serial data by said serial Tx/Rx and transferred to said FSK modem for transmission of said command code data to said attendant console data circuit via said digital data path.

3. The interface circuit as claimed in claim 2, wherein:

said digital interface further includes at least one output First In First Out (FIFO) memory device having its outputs connected to said central office exchange via said address/data bus, said output FIFO arranged to receive and store sequentially digital data transmitted by said attendant console; and, responsive to control signals from said serial Tx/Rx said interface controller process keycode data bytes transmitted to said serial Tx/Rx over said digital data path converting said data bytes into nibble form, storing said keycode data nibbles in said output FIFO in the exact sequence in which said central office exchange expects said data, and said interface controller signals said central office exchange that a data is available whereby, said central office exchange reads said data from said output FIFO.

4. The interface circuit as claimed in claim 3, wherein: said serial Tx/Rx receives keycode data over said digital data path from a data circuit on said attendant console and said keycode data is converted from serial data to parallel data bytes by said serial Tx/Rx and processed into nibble form by said interface controller and stored in said output FIFO.

5. The interface circuit as claimed in claim 4, wherein: said digital path comprises of at least a PCM receive path (PCMR) and the analog talk path comprises of at least a tip and ring conductor pair, said tip and ring conductors connected to an attendant console voice circuit on one end and to said analog interface via a hybrid coil on an opposite end, said analog interface further including a line matching network connected to said hybrid coil and a digital filter and CODEC, said CODEC connected to said PCMR path and arranged to receive said PCM digital signals and convert said PCM digital signals to analog voice signals, passing said analog voice signals to said attendant console voice circuit via said filter, line matching network, hybrid coil and tip and ring pair.

6. The interface circuit as claimed in claim 5, wherein: said digital path further includes a PCM transmit path (PCMX) and said CODEC is connected to said PCMX path and arranged to convert and transmit to said central office exchange via said PCMX path analog voice signals transmitted from said attendant console voice circuit over said tip and ring pair, hybrid coil, line matching network and digital filter.

* * * * *